United States Patent [19]

Pratt et al.

[11] 4,052,526

[45] Oct. 4, 1977

[54] INTUMESCENT FIRE RETARDANT MATERIAL AND ARTICLE

[75] Inventors: Richard D. Pratt, Cincinnati; Paul F. Proffitt, Reading; George Webb, Cincinnati, all of Ohio

[73] Assignee: General Electric Company, Cincinnati, Ohio

[21] Appl. No.: 687,102

[22] Filed: May 17, 1976

Related U.S. Application Data

[62] Division of Ser. No. 550,933, Feb. 19, 1975, Pat. No. 3,983,082.

[51] Int. Cl.² .............................................. B32B 9/04
[52] U.S. Cl. ...................................... 428/447; 428/450; 428/920; 428/921; 428/539; 428/457; 260/2.5 S; 260/2.5 AJ; 260/2.5 FP; 260/37 SB; 106/15 FP; 252/378 R; 252/62
[58] Field of Search ............... 428/921, 920, 457, 469, 428/472, 447, 539, 408, 450, 310, 311, 315; 252/378 R, 62; 106/15 FP; 260/2.5 AJ, 2.5 S, 2.5 FP, 37 SB, DIG. 24

[56] References Cited

U.S. PATENT DOCUMENTS

| 3,397,151 | 8/1968 | Payment | 252/378 R |
|---|---|---|---|
| 3,455,850 | 7/1969 | Saunders | 252/378 R |
| 3,515,624 | 6/1970 | Garnero | 252/378 R |
| 3,733,289 | 5/1973 | Burns et al. | 106/15 FP |
| 3,829,532 | 8/1974 | Meloy et al. | 428/921 X |
| 3,854,983 | 12/1974 | Brodnyan | 428/921 X |
| 3,914,513 | 10/1975 | Brown et al. | 428/921 X |
| 3,925,137 | 12/1975 | Kamel | 428/921 X |
| 3,928,505 | 12/1975 | Klicker et al. | 260/2.5 AJ |
| 3,934,066 | 1/1976 | Murch | 428/921 X |
| 3,956,202 | 5/1976 | Iwasaki | 260/2.5 AJ |
| 3,981,832 | 9/1976 | Godfried | 106/15 FP X |
| 4,001,126 | 1/1974 | Marion et al. | 252/62 X |

*Primary Examiner*—George F. Lesmes
*Assistant Examiner*—A. S. Thomas
*Attorney, Agent, or Firm*—Lee H. Sachs; Derek P. Lawrence

[57] ABSTRACT

A silicone resin base fire retardant system having a temperature capability at least to about 450° F (230° C) combines intumescent characteristics with a crusting and charring capability through use of a combination of an oxide of iron and a phosphate of potassium for crusting, along with a charring material such as tripentaerythritol and a blowing agent, such as melamine, in a silicone resin base to allow for adequate expansion.

3 Claims, No Drawings

4,052,526

INTUMESCENT FIRE RETARDANT MATERIAL AND ARTICLE

This is a divisional of application Ser. No. 550,933, filed Feb. 19, 1975, now U.S. Pat. No. 3,983,082, and is assigned to the assignee of the present invention.

BACKGROUND OF THE INVENTION

This invention relates to chemical fire retardant systems and, more particularly, to a silicone base intumescent fire retardant system having a temperature capability to at least about 450° F (230° C).

In the storage or use of flammable liquids, the problem of preventing, containing and extinguishing a fire must be considered. In such apparatus as relatively high temperature operating gas turbine engines, the problems are further complicated by the fact that the system must be able to withstand temperatures up to at least about 450° F (230° C) without decomposing or becoming ineffective. This limits the effectiveness of certain chemical reactions and organic compounds, useful at lower temperatures. For such applications in aircraft, the bulky, heavy, relatively inefficient passive systems are impractical. In addition, the active systems such as those involving chemical reactions are deficient for one or more of the reasons of weight, thermal stability, environmental resistance, adhesion, abrasion and flame erosion.

SUMMARY OF THE INVENTION

It is a principal object of the present invention to provide an improved intumescent fire retardant composition which has improved thermal stability, resistance to airborne particle abrasion and flame erosion resilience without cracking and spalling, and good adhesion to a substrate to enable efficient relatively inexpensive, application in gas turbine engines.

Another object is to provide an article, such as a gas turbine engine component, one surface of which is bonded or coated with such an improved fire retardant material.

These and other objects and advantages will be more fully understood from the following detailed description, as well as the examples, all of which are intended to be typical or representative of rather than in any way limiting on the scope of the present invention.

The invention, in one form, provides a material having a silicone resin base to which is added an intumescent fire retardant mixture including an oxide of iron and a phosphate of potassium to provide the material with crusting in the event of its exposure to a fire, a charring material to assist the crust and to provide insulative properties which enhances the fire protection, for example tripentaerythritol, and a foaming or blowing agent such as a melamine type. Such an intumescent mixture includes, by weight, 1–10 and preferably 2–4 parts of an oxide of iron, preferably ferric oxide; 17–52, and preferably 35–40 parts of a phosphate of potassium, preferably potassium orthophosphate; 2–30 and preferably 15–25 parts of a charring agent such as tripentaerythritol and 2–20, and preferably 6–9 parts of a foaming or blowing agent such as melamine. This mixture in the range of 22–112, and preferably about 70 parts by weight is mixed with 35–75 and preferably about 55 parts by weight of the silicon resin. The present invention is particularly useful in connection with metallic materials or alloys based on elements selected from Al, Mg and Ti.

The article with which the present invention is associated is one having a metallic surface, such as aluminum, magnesium, titanium or other alloys, to which is bonded the silicone resin — intumescent fire retardant mixture.

DESCRIPTION OF THE PREFERRED EMBODIMENTS

In the operation of an aircraft gas turbine engine, there are areas in which a fire retardant system is required to contain a fire to avoid it burning through relatively thin supporting structure. This containment allows a pilot sufficient time to shut down the engine and to activate a fire extinguishing system. Because of the emphasis on lightweight structures in aircraft engines in order to improve efficiency, the bulky, heavy passive-type systems are impractical for aircraft applications. Known chemical reaction type systems have been seen to become cracked or detached or both due to brittleness and poor adhesion, or to be eroded during normal operation of the engine as a result of abrasion from airborne particles or fluids, or to have insufficient thermal resistance during normal operating conditions to be available in the event of a fire.

Existing systems which utilize relatively low temperature organic binders or foaming agents, do not have the temperature capability for application in gas turbine engines. In addition, such resin systems as the epoxy or polyimide can result in too tight or too strong a matrix to allow the type of expansion desired in an improved fire retardant system.

It has been recognized that the use of a silicon resin, such as silicone resin RTV560, available commercially from General Electric Company, can provide a fire retardant material with good adhesion, temperature capability at least up to about 450° F (230° C) and desirable expansion characteristics. This provides the intumescent fire retardant material of the present invention with the ability to char, crust and expand, thus forming a combination of a hard fire barrier and thermal insulation. The blowing or foaming, the crusting and the charring characteristics are provided by the mixture of other ingredients according to the present invention.

Such a mixture includes an oxide of iron, preferably ferric oxide to provide, in the event of a fire, a crust of improved temperature stability, hardness and insolubility in those environmental liquids such as water, oil and fuel found in gas turbine engines. The oxide of iron is included in the range of about 1–10 parts by weight of the mixture and preferably ferric oxide in the range of 2–4 weight percent.

Assisting the iron oxide in the formation of a crust, in the event of a fire, is a phosphate of potassium which can be included in the range of about 17–52 parts by weight of the mixture and preferably in the range of 35–40 parts by weight. A preferred phosphate is potassium orthophosphate as a dehydrator. It has been found that sodium phosphate, which has water of hydration, is undesirable. Ammonium polyphosphate was found to degrade the silicone resin and tended to precipitate flow in the system in the range of about 250°–350° F. The phosphate of potassium acts as a dehydrator and at the same time improves the temperature capability while reducing secondary flame. Less than about 17 parts by weight results in a weak crust whereas greater than about 52 parts by weight of the phosphate of potassium provides no additional crust improvement.

Important to the intumescent mixture of the present invention is a charring material which has a relatively high temperature capability without deterioration, whose char in the event of a fire does not readily break down and which can assist in providing thermal insulation to the system. A material which has been found to fulfill these requirements is tripentaerythritol. Such material is included in the range of about 2-30 parts by weight and preferably about 15-25 parts by weight. Below about 2 parts by weight, there is insufficient material to generate an adequate carbon ash or char and above about 30 parts by weight, the material can support undesirable secondary flame.

Another ingredient of the intumescent mixture is a foaming or blowing agent included in the range of about 2-20 parts by weight and preferably about 6-9 parts by weight. One such material which has been found to be effective is melamine which decomposes and forms a gas to aid in the intumescent characteristic of the material of the present invention upon exposure to a fire.

The silicone resin used in one evaluation of the present invention was a General Electric Company silicone resin RTV560. The resin was prepared by catalyzing about 55 parts by weight of resin with about ½ part by weight of a catalyst commercially available as Thermolite 12 material. The catalyzed resin was extended with a solvent to a consistency suitable for spraying. To this thinned, catalyzed resin was added about 70 parts by weight of one form of the intumescent mixture of the present invention. In this example, this preferred mixture of powder ingredients having a maximum particle size of about 60 mesh size U.S. Standard Sieve consisted of, by weight, about 2.5-3.5 parts ferric oxide, about 36-38 parts potassium orthophosphate, about 7-8 parts melamine and about 20-25 parts tripentaerythritol.

The total material which included the intumescent mixture and the catalyzed silicon resin, appropriately thinned, was sprayed in thin layers, for example of at least about 0.01 inch (0.25 mm) in repeated layers on Al alloy specimen panels, typical of such metals or alloys based on Al, Mg or Ti. In this series of examples, the alloy was one consisting nominally, by weight of 4.4% Cu, 1.5% Mg, 0.6% Mn with the balance Al. The solvent was allowed to evaporate between layers. In this particular series of examples, an average total thickness of about 0.04 inch (1 mm) was attained.

After application of the material to the surface of the metallic specimen panels, the panels were tested by positioning the panels horizontally over a flame with the coating facing downward and exposing the coated side of the specimen to about 2000° F (1090° C) direct flame from a Meeker burner with an equivalent heat influx intensity of about 6000 BTU/hour for a duration of 15 minutes. The following Table includes typical test data for such an evaluation:

TABLE

2000° F FIRE TESTS 0.025" THICK Al

| | Time (Min:Sec) | Alloy Panels Backside Temp. (° F) |
|---|---|---|
| Specimen A; 0.039" Coating | 1:45 | 1000 |
| | 2:30 | 1100 |
| | 3:00 | 950 |
| | 5:00 | 740 |
| Specimen B; 0.044" Coating | 0:26 | 600 |
| | 1:45 | 800 |
| | 3:30 | 850 |
| | 4:30 | 700 |

In the above tests, the conditions remained stable after about 5 minutes and no burn through of the specimens occurred at the conclusion of the 15 minute tests. Very good char adhesion was observed.

As has been stated, the above-described intumescent mixture and the silicone resin are blended, in accordance with the present invention, in the range of 35-75 and preferably about 55 parts by weight silicone resin to 22-112, and preferably about 70 parts by weight of the intumescent mixture. It has been found that in excess of about 112 parts by weight of the intumescent filler mixture overloads the silicone resin base and results in a cork-like material. Less than about 22 parts by weight of the filler mixture results in insufficient intumescent and hard-shell surface forming characteristics. Below about 35 parts by weight of silicone does not provide adequate wetting or encapsulation of the dry components of the mixture.

Although the present invention has been described in connection with specific examples and materials, it will be understood by those skilled in the art the variations and modifications of which the invention is capable without departing from the intended functions of the ingredients and of the system involved. It is intended in the appended claims to cover equivalent materials and such variations and modifications.

What is claimed is:

1. A metallic article of manufacture including a metallic surface having bonded thereto an improved silicone-base intumescent fire retardant material comprising a mixture of:
   35-75 parts by weight of a silicone resin; and
   22-112 parts by weight of a mixture of ingredients comprising, by weight:
   1-10 parts of an oxide of iron;
   17-52 parts of a phosphate of potassium;
   2-30 parts of a charring material; and
   2-20 parts of a blowing agent.

2. The article of claim 1 in which the surface is a metallic material based on an element selected from the group consisting of Al, Mg, Ti and their alloys.

3. The article of claim 1 in which the mixture of ingredients comprises, by weight:
   2-4 parts ferric oxide;
   35-40 parts potassium orthophosphate;
   15-25 parts tripentaerythritol; and
   6-9 parts melamine.

* * * * *